United States Patent [19]

Willis et al.

[11] 3,881,071

[45] Apr. 29, 1975

[54] HOUSING FOR A TELEPHONE UNIT

[75] Inventors: Wesley Nelson Willis; Graham Sterling Laing, both of London, Ontario, Canada

[73] Assignees: Bell-Northern Research Ltd., Ottawa, Ontario; Northern Electric Company, Limited, Montreal, Quebec, both of Canada; a part interest to each

[22] Filed: May 7, 1973

[21] Appl. No.: 357,595

[52] U.S. Cl. .......... 179/179
[51] Int. Cl. .......... H04m 1/02
[58] Field of Search.... 179/179, 178, 100 R, 100 D, 179/91 R, 27 CA; 49/397, 381

[56] References Cited

UNITED STATES PATENTS

| | | | |
|---|---|---|---|
| 1,799,610 | 4/1931 | Wilde | 49/397 X |
| 2,016,475 | 10/1935 | Arndt | 179/91 R |
| 2,067,246 | 1/1937 | Saxby | 179/91 R |
| 2,762,475 | 9/1956 | Bowden | 49/397 X |
| 2,799,890 | 7/1957 | Stavich | 49/397 X |
| 3,243,517 | 3/1966 | Miller et al. | 179/90 |
| 3,384,717 | 5/1968 | Coston | 179/27 CA |
| 3,480,743 | 11/1969 | Engh et al. | 179/178 |
| 3,657,487 | 4/1972 | Schwanck et al. | 179/100 R |

*Primary Examiner*—Thomas W. Brown
*Attorney, Agent, or Firm*—Sidney T. Jelly

[57] ABSTRACT

A housing for a telephone unit such as a private branch exchange is composed of extrusions which hinge together by means of interengaging formations formed as parts of the extrusions. The housing can be opened up for servicing or repair without disconnection and the unit can continue to operate. Production costs are reduced and assembly is quick and easy.

6 Claims, 8 Drawing Figures

HOUSING FOR A TELEPHONE UNIT

This invention relates to housings for telephone units, and in particular for automatic branch exchange telephone units, as are used in offices, stores and other premises. Such exchanges are often referred to as "Private Automatic Branch Exchanges" (PABX).

A unit, as used as a branch exchange, normally has a plurality of telephone lines, to which incoming calls can be connected, and an outward dialling facility which again can be connected to any of the plurality of telephone lines. The unit is usually mounted on the operators desk, the operator usually having other duties in addition to operating the exchange. It is desirable that the unit be compact and also be attractive in appearance.

In conventional branch exchanges it is a disadvantage that where the unit is being worked on by maintenance or repair personnel the exchange is out of action. It is normal that the top of the unit must be completely removed, and often also one or more items have to be loosened or removed. The housings of conventional units are also usually built up of a number of parts separately assembled and are a relatively expensive item.

The present invention provides a housing for a telephone unit which is formed by using extruded sections, the sections being given particular cross-section forms whereby the sections interengage to form the housing. In addition the cross-section forms provide a hinging or pivotting action between a section forming the top part of the housing and the base of the housing. By this facility it is possible to service a unit without disconnection and the unit can continue in operation.

A unit using the invention is very easy and simply to assemble and is less costly than conventional forms of construction. The housing is strong and rigid and can be enclosed in an outer casing or housing which is lightweight and attractive.

The invention will be understood by the following description of one embodiment by way of example, in conjunction with the accompanying drawings, in which.

Figure 1:
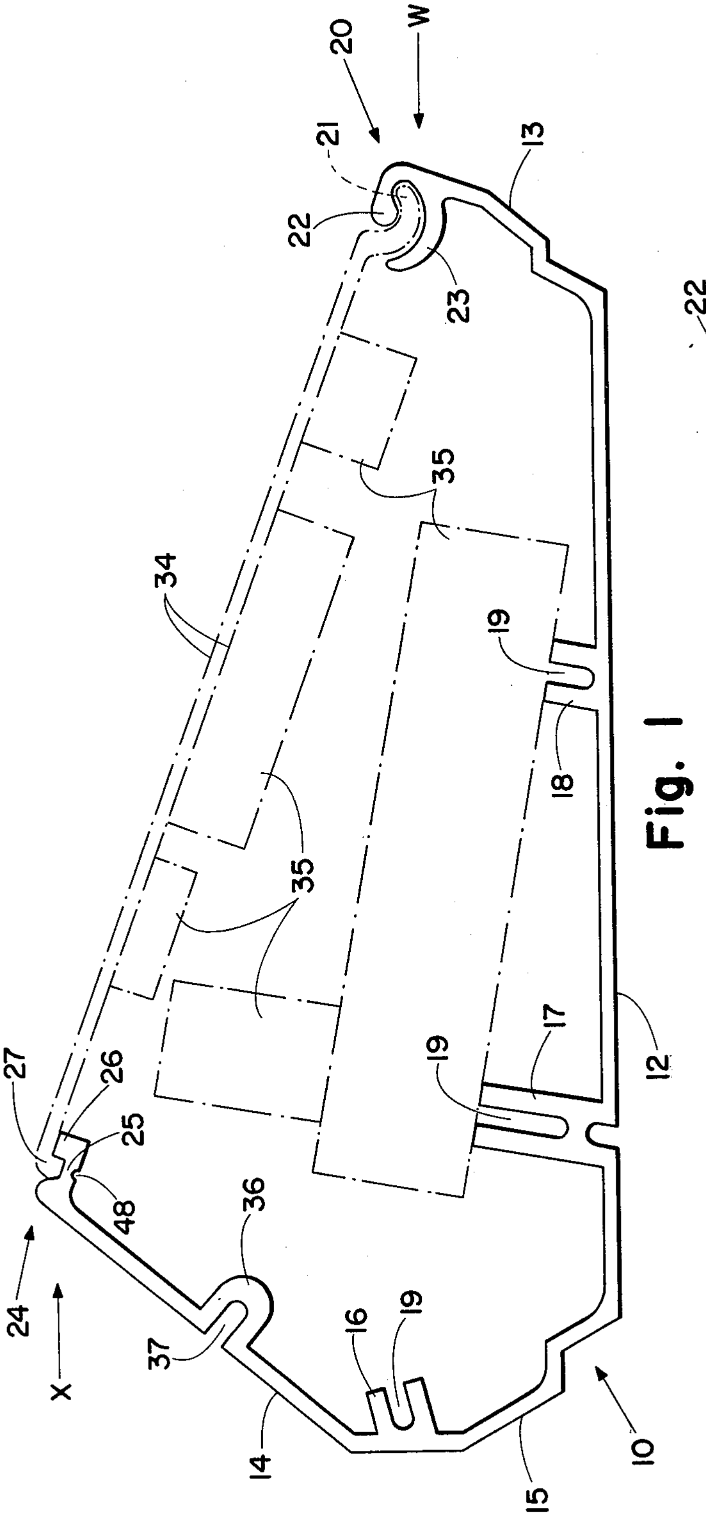
FIG. 1 is a cross-section through an extruded section forming a base of a housing.

The housing base 10, illustrated in FIG. 1, is an aluminum alloy extrusion. The extrusion is made in long lengths and pieces each of a length for one base cut off the long length. The base has a bottom web 12, a front web 13, and a rear web 14 defining a channel formation; bottom web 12 and rear web 14 being connected by an intermediate portion 15. The whole forms a partially enclosed space or volume of channel formation, in which is contained the circuitry of the telephone unit. Various ribs 16, 17 and 18 are provided extending the length of the base. The ribs each have a channel 19 extending the length of the rib and various items of the circuitry and mounted on the ribs. Self-tapping or standard machine screws can be used to fasten the items, the screws threading into the channel 19.

Figure 2:
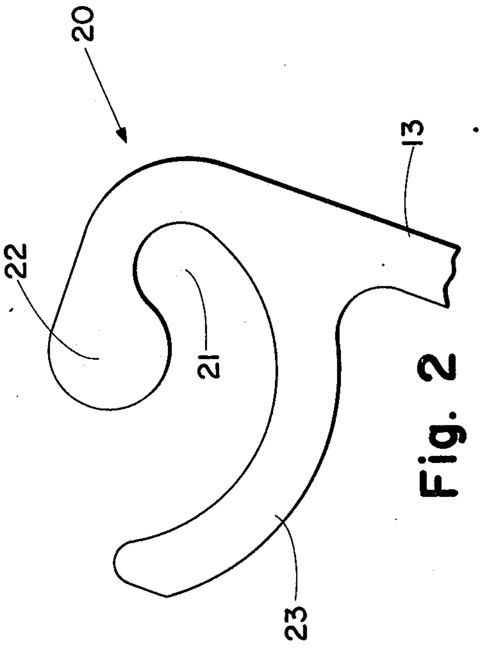
FIGS. 2 and 3 are enlarged cross-sections of the formations at each edge of the section of FIG. 1, indicated by arrows W and X respectively.
Figure 3:
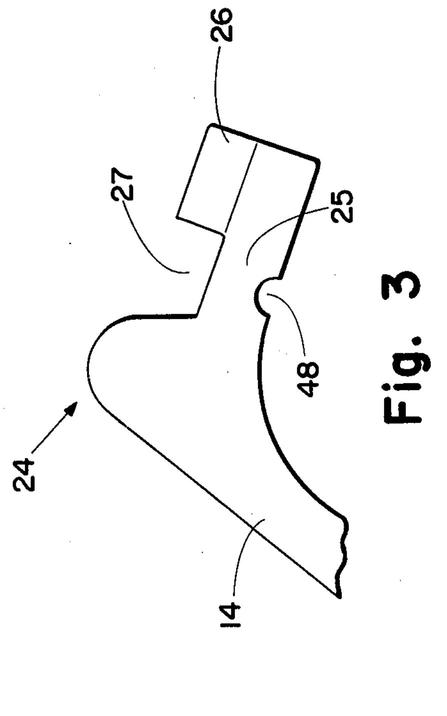

At the top front edge 20 the section has a formation which provides an arcuate groove 21. This is formed by a beaded edge 22 and a curved or arcuate rib 23 extending parallel to and spaced from the beaded edge 22. At the top rear edge 24 an inwardly projecting rib 25 is provided. This rib 25 is increased in thickness at the edge 26 to form a channel 27. The formations at the top front and rear edges are seen in more detail in FIGS. 2 and 3 respectively.

Figure 4:
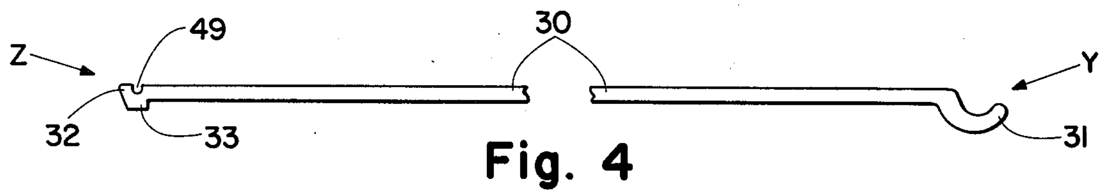
FIG. 4 is a cross-section through an extruded section forming a top of a housing.
Figure 6:
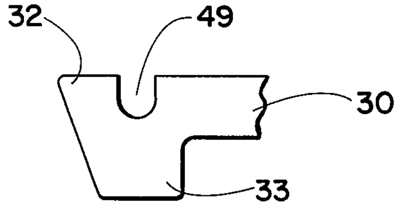
FIGS. 5 and 6 are enlarged cross-sections of the formations at each edge of the section of FIG. 4, indicated by arrows Y and Z respectively.
Figure 5:
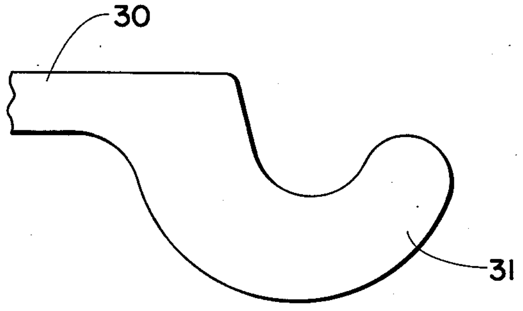

The housing top 30, illustrated in FIG. 4, is a substantially planar extrusion, again of aluminum alloy. As for the housing base 10, a long extrusion is made and short lengths cut off for the tops 30. The front edge is in the form of an arcuate web 31, (viewed in cross-section normal to the length of the housing top.). The arcuate web 31 is such as to be a sliding fit in the arcuate groove 21 at the top front edge 20 of the housing base 10. The rear edge 32 has a downwardly projecting rib 33 which is of a shape and size to fit into the channel 27 at the top rear edge 24 of the housing base 10. The formations at front and rear edges are seen in more detail in FIGS. 5 and 6 respectively. The lines of the radius of curvature of the arcuate groove 21 and the arcuate web 31 is external to the channel formation formed by the housing base.

Figure 7:
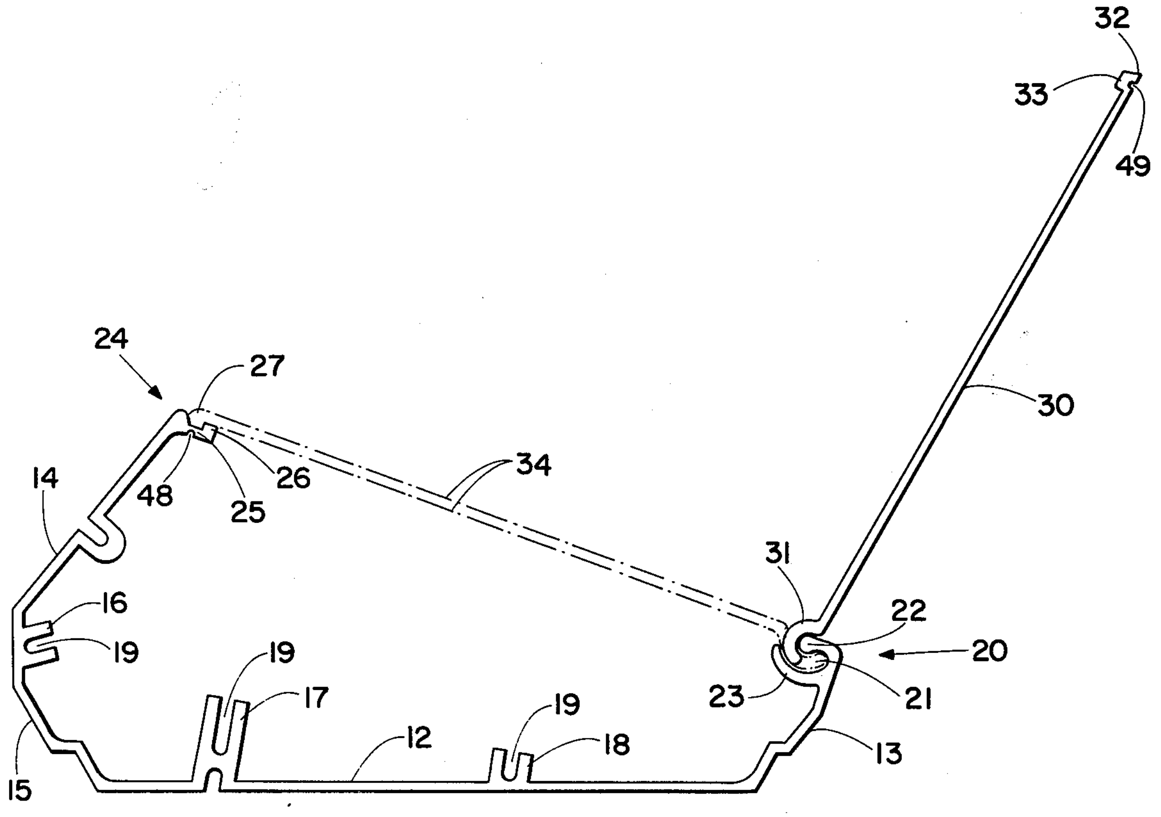
FIG. 7 is a cross-section, similar to that of FIG. 1, illustrating the top of the housing pivotted to an open position on the base of the housing.

The housing is assembled by either sliding the top 30 into position, the arcuate front edge 31 sliding in the arcuate groove 21, or by inserting the front edge 31 into the arcuate groove 21 with the top 30 extending upwardly, as illustrated in FIG. 7. The top is then pivotted down until the rib 33 seats in the channel 27. The closed position is indicated in FIGS. 1 and 7 by the chain dotted lines 34. Chain dotted lines 35, FIG. 1, indicate possible positions of certain items of circuitry.

The rear web 14 of the housing base 10 (FIG. 1) has a longitudinal rib 36. This rib 36 has a channel 37 formed therein which is open to the exterior of the housing instead of the interior —as do the channels 19. It is possible to mount additional items on the outside of the housing by screws threading into the channel 37. An example of such an item is an indicator panel for the telephone unit.

Figure 8:
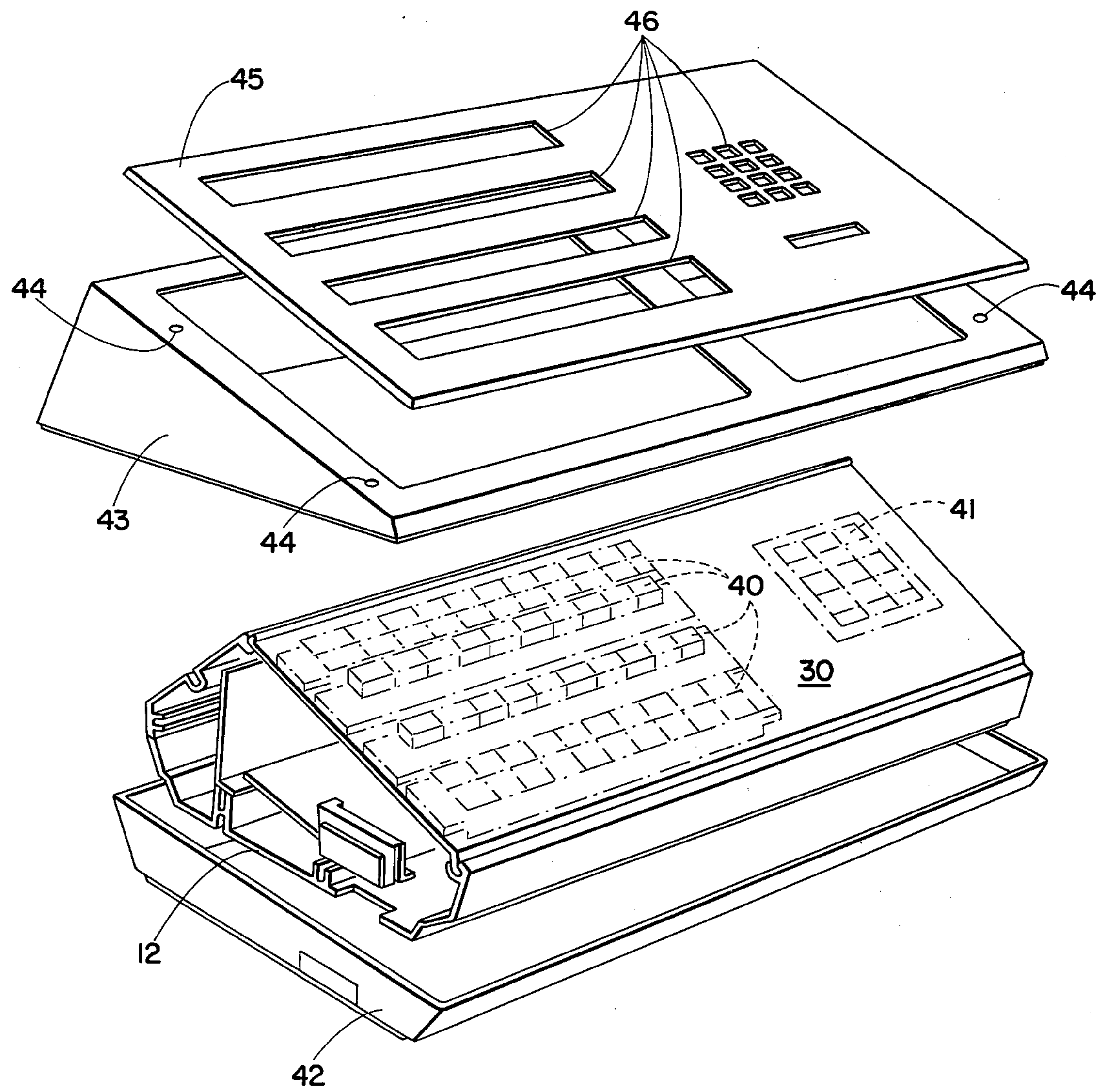
FIG. 8 is a perspective view of an assembled housing shown in spaced relationship to outer casings or housings.

FIG. 8 illustrates a housing which is assembled —with external circuitry (not seen) pushbuttons and indicator lamps 40 and a dial 41. The housing fits into a bottom casing 42, being retained therein by screws, not shown, extending up through the casing 42 into the housing base. A top casing 43 fits over the housing being attached thereto by screws 44. A face plate or panel 45 is attached to the top casing, having apertures 46 for the buttons 40 and dial 41. The housing top is held down on the housing base by spring clips 47 which are slid on at each end, the clips having two legs, one leg entering a groove 48 in the rib 25 of the housing base and the other leg entering a groove 49 in the rear edge 32 of the housing top 30.

The exterior of the unit is readily accessible. The screws 44 retaining the top casing 43 are removed, the casing lifted off and the spring clips 47 removed. The housing top can then be pivotted, the arcuate rib 31 remaining in the arcuate groove 21. No wiring is disconnected, and calls already connected can be continued. It is also possible to receive and make calls while the housing top is lifted up. Thus much inconvenience is avoided, and also tracing of faults and other troubles is simplified.

Although the housing has been described, and illustrated, as having the arcuate groove -forming formation on the top front edge 20 of the housing base 10 and an arcuate front edge 31 for the housing top 30, it is possible to reverse this arrangement, forming the groove on the front edge of the housing top 30 and the cooperative arcuate formation on the top front edge of the housing base 10.

What is claimed is:

1. A housing for a telephone unit, comprising:
- a bottom casing;
- a housing base positioned on and fastened to the bottom casing, said housing base comprising a length cut from a metal extrusion and including a bottom web having parallel front and rear edges, front and rear webs extending laterally along and upwardly from said front and rear edges to define a trough shaped member;
- a housing top of planar form, comprising a length cut from a metal extrusion, and including front and rear edges;
- means slidably and pivotally mounting said housing top at its front edge on a top edge of said front web of said housing base, said means comprising an arcuate groove on one of said front edges of said housing top and said top edge of said front web and a cooperative arcuate web on the other of said front edge and top edge, the locus of said arcuate groove disposed outwardly from said groove relative to said bottom web of said housing base, and cooperative formations on said rear edge of the housing top and a top edge of said rear end of the housing base, said housing base and housing top forming an enclosure open at both ends;
- means for mounting circuit members on said housing base and on said housing top;
- a top casing positioned over said housing top and said housing base, and cooperating with said bottom casing to form a closed enclosure around said housing top and base;
- apertures in said top casing for the reception of circuit members;
- the whole so adapted and arranged that on removal of said top casing, said housing top is pivotally movable upward about the front edge of the housing top for access to said circuit members without disconnection of said circuit members or cessation of service by said telephone unit.

2. A housing as claimed in claim 1, including ribs extending laterally on an inner surface of said housing base, and a groove extending laterally in each web.

3. A housing as claimed in claim 1, said top edge of said rear web of said housing base including a channel formation extending laterally of the housing base, said rear edge of said housing top including a rib extending laterally and adapted to fit in said channel formation.

4. A housing for an automatic branch exchange telephone unit comprising:
- a bottom casing;
- a housing base positioned on and fastened to the bottom casing, said housing base comprising a length cut from a metal extrusion and including a bottom web having parallel front and rear edges, front and rear webs extending laterally along and upwardly from said front and rear edges to define a trough shaped member, said bottom web including means for mounting circuit members thereon;
- a housing top of planar form, comprising a length cut from a metal extrusion, and including front and rear edges;
- means slidably and pivotally mounting said housing top at its front edge on a top edge of said front web of said housing base, said means comprising an arcuate groove on one of said front edges of said housing top and said top edge of said front web and a cooperative arcuate web on the other of said front edge and said top edge, the locus of said arcuate groove disposed outwardly from said groove relative to said bottom web of said housing base, and cooperative formations on said rear edge of the housing top and a top edge of said rear end of the housing base, said housing base and housing top forming an enclosure open at both ends;
- circuit members mounted on said housing base; a plurality of push-buttons and indicators mounted on said housing;
- a top casing positioned over said housing top and said housing base, and cooperating with said bottom casing to form a closed enclosure around said housing top and base;
- apertures in said top casing for the reception of said push-buttons and indicators;
- the whole so adapted and arranged that on removal of said top casing, said housing top is pivotally movable upward about the front edge of the housing top for access to said circuit members without disconnection of said circuit members or cessation of service by said telephone unit.

5. A housing as claimed in claim 4, including a telephone dial mounted on said housing top and an aperture in said top casing for reception of said dial.

6. A housing as claimed in claim 4, including circuit members mounted on an under surface of said housing top, said plurality of pushbuttons and indicators mounted on a top surface of said housing top; and a face plate on said top casing, said push-buttons and indicators protruding through apertures in said face plate.

* * * * *